United States Patent
Affronti et al.

(10) Patent No.: US 8,881,020 B2
(45) Date of Patent: Nov. 4, 2014

(54) MULTI-MODAL COMMUNICATION THROUGH MODAL-SPECIFIC INTERFACES

(75) Inventors: Michael Anthony Affronti, Seattle, WA (US); Nathaniel Eric Breskin-Auer, Bellevue, WA (US); Robert Emmett McCann, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 825 days.

(21) Appl. No.: 12/145,498

(22) Filed: Jun. 24, 2008

(65) Prior Publication Data

US 2009/0319918 A1  Dec. 24, 2009

(51) Int. Cl.
*G06F 3/00* (2006.01)
*H04L 12/58* (2006.01)
*G06F 9/54* (2006.01)
*G06F 3/038* (2013.01)

(52) U.S. Cl.
CPC ............ *G06F 3/038* (2013.01); *H04L 12/5835* (2013.01); *H04L 51/066* (2013.01); *G06F 2203/0381* (2013.01); *G06F 9/541* (2013.10)
USPC ............................ 715/744; 715/753; 715/758

(58) Field of Classification Search
USPC .................................. 715/751–753, 758, 744
See application file for complete search history.

(56) References Cited

U.S. PATENT DOCUMENTS

| | | | |
|---|---|---|---|
| 6,216,173 B1 * | 4/2001 | Jones et al. | 715/705 |
| 6,286,104 B1 * | 9/2001 | Buhle et al. | 726/4 |
| 6,397,264 B1 | 5/2002 | Stasnick et al. | |
| 6,430,604 B1 * | 8/2002 | Ogle et al. | 709/207 |
| 6,549,937 B1 * | 4/2003 | Auerbach et al. | 709/206 |
| 6,779,060 B1 | 8/2004 | Azvine et al. | |
| 7,111,044 B2 | 9/2006 | Lee | |
| 7,277,951 B2 * | 10/2007 | Marriott et al. | 709/228 |
| 7,315,613 B2 * | 1/2008 | Kleindienst et al. | 379/88.13 |
| 7,363,344 B1 * | 4/2008 | Coletrane et al. | 709/206 |
| 7,363,345 B2 * | 4/2008 | Austin-Lane et al. | 709/207 |
| 7,376,701 B2 * | 5/2008 | Bhargava et al. | 709/206 |
| 7,552,183 B2 * | 6/2009 | Coletrane et al. | 709/206 |

(Continued)

FOREIGN PATENT DOCUMENTS

| | | |
|---|---|---|
| JP | 2004-015710 A | 1/2004 |
| JP | 2004-241946 | 8/2004 |

(Continued)

OTHER PUBLICATIONS

Hyeong-Muk Im, KR 10-2008-0049289, Real-Time Intergration Messaging System for Providing Instant Messaging Server and Electronic Mail Server and Service Method Thereof, publication date: Jun. 4, 2008, [English Translation {machine translation} by the Korean Intellectual Property Office, 18 pages ].*

(Continued)

*Primary Examiner* — Steven Sax
*Assistant Examiner* — Wilson Varga
(74) *Attorney, Agent, or Firm* — Tom Wong; Jim Ross; Micky Minhas (57) ABSTRACT

Technologies are described herein for providing multi-modal communication through modal-specific interfaces. In one method, a communication in a first modality is received from a first interface across a computer network. The communication is converted into a second modality. Upon converting the communication into the second modality, the communication is provided to a second interface across the computer network.

5 Claims, 4 Drawing Sheets

(56) References Cited

U.S. PATENT DOCUMENTS

| | | | |
|---|---|---|---|
| 7,818,374 B2* | 10/2010 | Bates et al. | 709/204 |
| 8,060,566 B2* | 11/2011 | Appleman | 709/206 |
| 8,161,117 B2* | 4/2012 | Ye et al. | 709/206 |
| 2002/0021307 A1* | 2/2002 | Glenn et al. | 345/753 |
| 2002/0150091 A1 | 10/2002 | Lopponen et al. | |
| 2002/0194388 A1* | 12/2002 | Boloker et al. | 709/310 |
| 2003/0046401 A1 | 3/2003 | Abbott et al. | |
| 2003/0164859 A1 | 9/2003 | Evans | |
| 2004/0061718 A1* | 4/2004 | Fitzpatrick et al. | 345/758 |
| 2004/0064514 A1* | 4/2004 | Daniell et al. | 709/206 |
| 2004/0128342 A1* | 7/2004 | Maes et al. | 709/200 |
| 2004/0215721 A1* | 10/2004 | Szeto et al. | 709/204 |
| 2005/0132012 A1* | 6/2005 | Muller et al. | 709/206 |
| 2005/0203757 A1* | 9/2005 | Lei et al. | 705/1 |
| 2006/0005133 A1* | 1/2006 | Lyle et al. | 715/708 |
| 2006/0017709 A1 | 1/2006 | Akihiro | |
| 2006/0168095 A1* | 7/2006 | Sharma et al. | 709/217 |
| 2006/0281474 A1* | 12/2006 | Domville et al. | 455/466 |
| 2007/0050722 A1 | 3/2007 | Schulz et al. | |
| 2007/0116195 A1* | 5/2007 | Thompson et al. | 379/67.1 |
| 2007/0130259 A1* | 6/2007 | Daniell et al. | 709/204 |
| 2007/0293212 A1 | 12/2007 | Quon et al. | |
| 2008/0059587 A1 | 3/2008 | Burtner et al. | |
| 2010/0169424 A1* | 7/2010 | Gustafsson et al. | 709/206 |

FOREIGN PATENT DOCUMENTS

| | | | | |
|---|---|---|---|---|
| JP | 2005-018423 A | | 1/2005 | |
| KR | 10-2008-0049289 A | | 6/2008 | |
| KR | 10-20080049289 | * | 6/2008 | G06Q 10/00 |
| RU | 2299528 | | 5/2007 | |
| RU | 2006102661 | | 8/2007 | |
| WO | WO 2006/101428 | | 9/2006 | |

OTHER PUBLICATIONS

IEEE 100, The Authoritative Dictionary of IEEE Standards Terms, 7th edition, copyright 2000 by The Institute of Electrical and Electronics Engineers. ISBN 0-7381-2601-2. "interface" definitions. pp. 574-576.*

IBM, "A means for routing a human to human collaboration based on message context and user roles", Jun. 14, 2005, IPCOM000125722D, pp. 1-3.*

IBM, "Synchronous / Asynchronous instant messaging chat gateway using an event processing infrastructure," Jun. 28, 2007, IPCOM000154357D, pp. 1-2.*

Kelly, "IBM's Unified Communications and Collaboration Strategy", May 2007, Wainhouse Research, LLC, pp. 13.

Chakraborty, et al., "Pervasive Enablement of Business Processes", Proceedings of the Second IEEE Annual Conference on Pervasive Computing and Communications (PERCOM'04), IEEE Computer Society, IEEE, 2004, pp. 11.

International Search Report dated Dec. 23, 2009 in International Application No. PCT/US2009/044101.

Chinese Official Action dated Mar. 1, 2012 in Chinese Application No. 200980124693.2.

European Search Report dated Dec. 20, 2011 in European Application No. 09798372.0.

Chinese Official Action dated Dec. 11, 2012 in Chinese Application No. 200980124693.2

Japanese Official Action dated Nov. 13, 2012 Japanese Application No. 2011-516369.

Chinese Official Action dated Mar. 27, 2013 in Chinese Application No. 200980124693.2.

Japanese Official Action dated Apr. 30, 2013 in Japanese Application No. 2011-516369.

Russian Official Action dated Jun. 13, 2013 in Russian Application No. 2010152821.

Abstract Russia Patent No. RU 2295841 published Mar. 20, 2005 in the name of Jussi et al.

Russia Notice of Allowance dated Jan. 27, 2014 in Russian Application No. 2010152821.

Australian Official Action dated Mar. 6, 2014 in Australian Application No. 2009271514.

Australian Official Action dated May 16, 2014 in Australian Application No. 2009271514.

Australian Official Action dated Jul. 31, 2014 in Australian Application No. 2009271514.

* cited by examiner

MULTI-MODAL COMMUNICATION THROUGH MODAL-SPECIFIC INTERFACES

BACKGROUND

The rapid growth of computer networks has created new modalities of communication over these computer networks. These new modalities include, among others, email, chat (i.e., instant messaging), short message service ("SMS"), and voice over Internet Protocol ("VoIP"). In conventional implementations, a dedicated user interface is provided for each modality. For example, a first user interface may be provided enabling a user to send an email message, while a second user interface may be provided enabling a user to chat by transmitting and receiving instant messages. In many cases, the first user interface is provided in an entirely separate window than the second user interface, thereby causing the user to alternate, sometimes awkwardly, between windows in order to send an email and to chat at the same time.

Further, communications through the first interface are typically mutually exclusive from communications through the second interface. For example, an email exchange between two users bears no relation to a chat exchange between the same two users, even if the email exchange and the chat exchange occur at the same time. As such, users are generally responsible for maintaining communications between multiple modalities, thereby creating additional challenges with respect to communicating across multiple modalities.

It is with respect to these considerations and others that the disclosure made herein is presented.

SUMMARY

Technologies are described herein for providing multi-modal communication through modal-specific user interfaces. In particular, a communication controller is provided that enables one user interface operating under one modality to communicate with another user interface operating under another modality. For example, the communication controller may enable a first user utilizing an email interface to communicate with a second user utilizing a chat interface.

In order to display communications generated in one modality on an interface designed for another modality, the communication controller may be adapted to convert communications from one modality into another modality. Examples of modalities may include, but are not limited to, email, chat (i.e., instant messaging), short message service ("SMS"), and voicemail. The communication controller may be further adapted to operate in the background of a communications network between two or more users. Thus, a user may seamlessly transmit and receive communications through her preferred modality irrespective of the other user's chosen interface or modality. Since a user can transmit and receive communications in a single modality, the responsibility of maintaining any knowledge or concern for the modality of others can be removed from the user.

According to one aspect presented herein, a computer program provides multi-modal communication through modal-specific interfaces. The computer program receives, from a first interface across a computer network, a communication in a first modality. The computer program converts the communication into a second modality. Upon converting the communication into the second modality, the computer program provides the communication to a second interface across the computer network.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for providing multi-modal communication through a modality-specific user interface. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
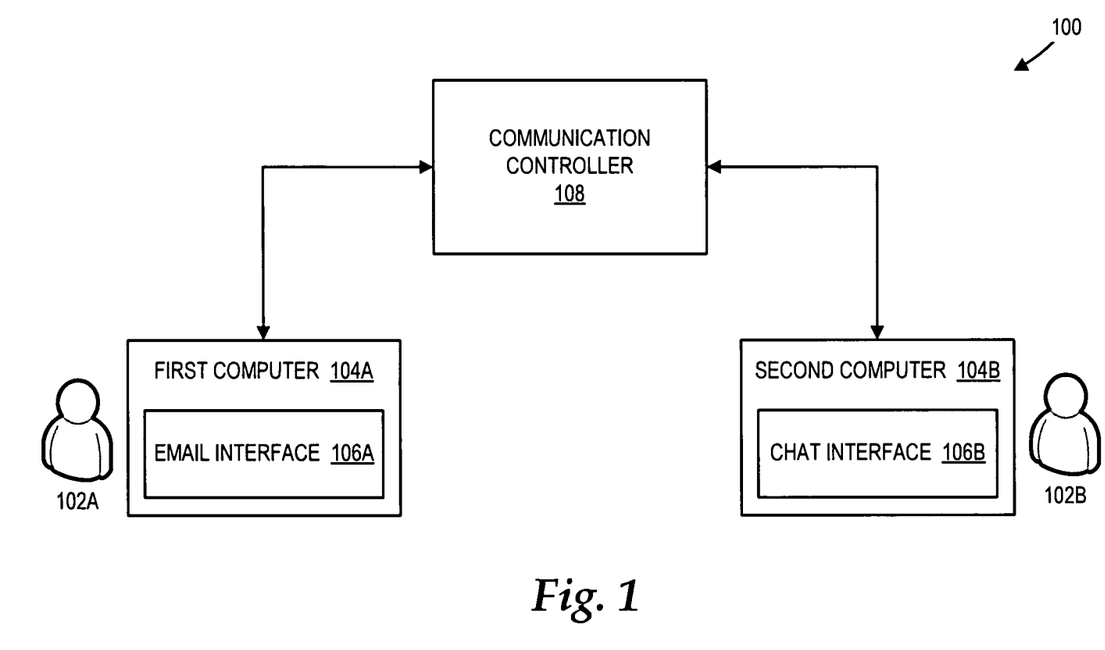
FIG. 1 is a block diagram showing a network architecture configured to provide multi-modal communication through modal-specific interfaces, in accordance with one embodiment.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for providing multi-modal communication through a modality-specific user interface will be described. FIG. 1 shows an illustrative network architecture 100 including a first user 102A and a second user 102B. The first user 102A operates a first computer 104A, which includes an email interface 106A. The second user 102B operates a second computer 104B, which includes a chat interface 106B. The first user 102A and the second user 102B may be collectively referred to as users 102. The email interface 106A and the chat interface 106B may be collectively referred to as interfaces 106.

The email interface 106A may be any suitable interface capable of enabling the first user 102A to transmit emails to and to receive emails from other users. Examples of email interfaces include those provided by GROUPWISE™ from NOVELL INC. and OUTLOOK® messaging and collaboration client from MICROSOFT CORPORATION. In one embodiment, the email interface 106A is a dedicated email application. The email interface 106A may be a standalone application executing on the first computer 104A. In the alternative, the email interface 106A may be a web application accessible through a web browser executing on the first computer 104A. In another embodiment, the email interface 106A is provided within any suitable application.

The chat interface 106b may be any suitable interface capable of enabling the second user 102B to transmit instant messages to and to receive instant messages from other users. Examples of chat interfaces include those provided by AOL® INSTANT MESSENGER™ software from AOL LLC and WINDOWS MESSENGER® messaging client from MICROSOFT CORPORATION. In one embodiment, the chat interface 106B is a dedicated instant messaging application. The chat interface 106B may be a standalone application executing on the second computer 104B. In the alternative, the chat interface 106B may be a web application accessible through a web browser (not shown) executing on the second computer 104B. In another embodiment, the chat interface 106B is provided within any suitable application.

It should be appreciated that the email interface 106A and the chat interface 106B are merely illustrative examples of communication interfaces. Other suitable communication interfaces that enable users to communicate via text, images, audio, video, and combinations thereof may be similarly utilized. It should further be appreciated that each communication interface may be specific to a particular modality. Each communication interface may be distinguished by its design, which can be optimized for a specific modality, as well as by the modal-specific options that are provided. In many cases, even if the interfaces 106 are provided in a single application, the interfaces 106 are still typically distinguished from each other via a drop-down menu or other suitable interface selection mechanism. In the alternative, the application may automatically switch the interfaces 106 for the users.

As illustrated in FIG. 1, the network architecture 100 further includes a communication controller 108. According to embodiments, the communication controller 108 enables the first user 102A utilizing the email interface 106A and the second user utilizing the chat interface 106B to seamlessly communicate. In particular, the communication controller 108 enables the first user 102A to communicate using the email interface 106A without knowledge of or concern for the particular modality being used by the second user 102B or any other user. Similarly, the communication controller 108 enables the second user 102B to communicate using the chat interface 106B without knowledge of or concern for the modality or communication interface being used by the first user 102A or any other user.

For example, when the first user 102A sends an email to the second user 102B, the communication controller 108 converts the email into an instant message and provides the instant message to the second user 102B via the chat interface 106B. Since the second user 102B is provided with an instant message instead of an email, the second user 102B may have no knowledge that the first user 102A is using the email interface 106A. As far as the second user 102B is concerned, the first user 102A may even be using another chat interface.

Upon receiving the instant message from the first user 102A through the communication controller 108, the second user 102B may reply to the instant message through the chat interface 106B. When the second user 102B sends the instant message reply to the first user 102A, the communication controller 108 converts the instant message reply into an email and provides the email to the first user 102A through the email interface 106A. Since the first user 102A is provided with an email instead of an instant message, the first user 102A may have no knowledge that the second user 102B is using the chat interface 106B. As far as the first user 102A is concerned, the second user 102A may even be using another email interface.

The ability for the first user 102A and the second user 102B to communicate through separate interfaces and across different modalities without any knowledge of or concern for the other's modality provides an additional level of abstraction over conventional implementations. The communication controller 108 essentially hides the possibility that multiple users may be utilizing interfaces operating under different modalities. Accordingly, a user can utilize her preferred communication interface, even if the communication interface is modality-specific and operates under a different modality than other users.

In contrast, a conventional implementation that provides multi-modal communication typically does not allow a user to choose a preferred communication interface irrespective of other users. In one example, a sender may be limited to using the chat interface 106B only when the recipient is online (i.e., presence information). In another example, a recipient who receives an email from the email interface 106A may be limited to viewing the email on another email interface. That is, the recipient cannot choose whether to receive the email in another format, such as SMS or voicemail messages, by default.

In one embodiment, the users 102 may configure the communication controller 108 to convert incoming communications under one modality into one or more other modalities. For example, the first user 102A may configure the communication controller 108 to convert incoming communications into emails and voicemail messages. If the incoming message is text-based, the voicemail messages may be generated via a suitable text-to-speech converter.

The users 102 may further configure the communication controller 108 to select appropriate modalities based on predefined conditions being met or business logic. For example, the second user 102B may configure the communication controller 108 to convert incoming communications into an instant message if the second user 102B is online or into a SMS message if the second user 102B is offline. By enabling the users 102 to specify logic defining how the users 102 will receive incoming communications, the communication controller 108 provides enhanced flexibility over conventional implementations.

Figure 2:
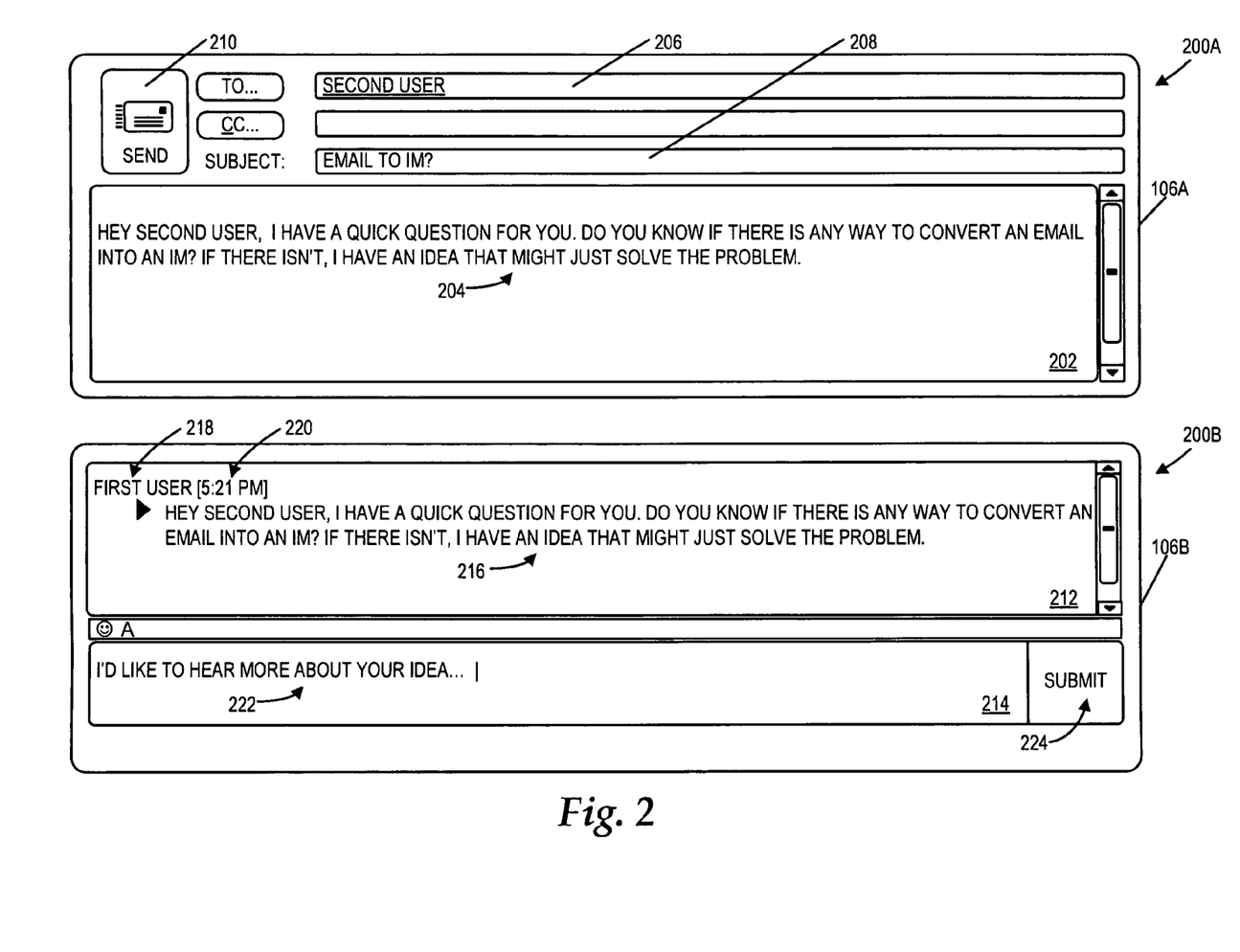
FIG. 2 is a dual screen capture diagram showing a illustrative communicate between separate modal-specific interfaces, in accordance with one embodiment.

Referring now to FIG. 2, additional details will be provided regarding communication between the interfaces 106. In particular, FIG. 2 includes screen capture diagrams 200A-200B showing an illustrative conversation between the first user 102A and the second user 102B. As previous mentioned with respect to FIG. 1, the first user 102A transmits and receives communications via the email interface 106A, and the second user 102B transmits and receives communications via the chat interface 106B. Also as previously mentioned, the communication controller 108 enables the users 102 to communicate through their respective interfaces 106 without knowledge of the other user's specific modality or communication interface.

As illustrated in FIG. 2, the first screen capture diagram 200A displays the email interface 106A used by the first user 102A. The email interface 106A includes an email composition window 202 where the first user 102A has composed an email 204 to the second user 102B. The email interface 106A includes a recipient field 206 designated by the word "to" as well as a subject field 208. Upon composing the email 204 in the email composition window 202, the first user 102A accesses (e.g., clicks on) a send button 210 to send the email 204 to the second user 102B.

As further illustrated in FIG. 2, the second screen capture diagram 200B displays the chat interface 106B used by the second user 102B. The chat interface 106B includes a reading pane 212 and a writing pane 214. The reading pane 212 displays incoming instant messages. In particular, in FIG. 2, the reading pane 212 displays an instant message 216 that the communication controller 108 has converted from the email 204. The instant message 216 includes sender information 218 indicating that the first user 102A sent the instant message 216 as well as a time stamp 220 indicating the time that the first user 102A sent the instant message 216. It should be noted that no where in the reading pane 212 does it indicate that the first user 102A sent an email through the email interface 106A. The communication controller 108 effectively abstracts this information, thereby providing a more customized experience for the second user 102B.

The writing pane 214 enables the second user 102B to enter a reply to the instant message 216 in the form of an instant message 222. Once the second user 102B accesses a submit button 224 to submit the instant message 222 to the first user 102A, the communication controller 108 converts the instant message 222 into an email. For example, the email converted from the instant message 222 may be displayed in an inbox (not shown) or other suitable notification interface within the email interface 106A.

Figure 3:
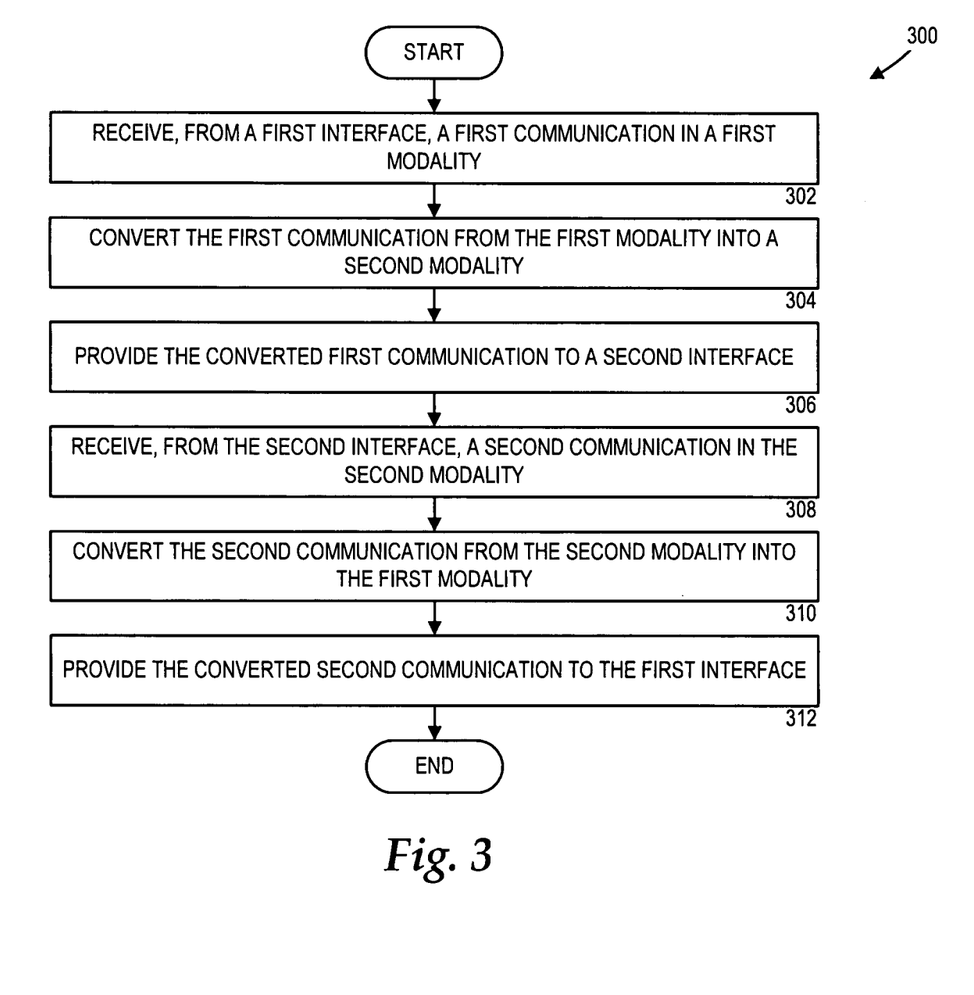
FIG. 3 is a flow diagram showing an illustrative method for providing modal-specific interfaces, in accordance with one embodiment.

Turning now to FIG. 3, additional details will be provided regarding the operation of the communication controller 108. In particular, FIG. 3 is a flow diagram illustrating aspects of a method provided herein for providing multi-modal communication through modal-specific interfaces. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

Referring to FIG. 3, a routine 300 begins at operation 302, where the communication controller 108 receives a first communication in a first modality from a first interface. For example, if the first interface is the email interface 106A, then the modality of the first communication is email. The routine 300 then proceeds to operation 304, where the communication controller converts the first communication from the first modality into a second modality associated with a second interface. For example, if the second interface is the chat interface 106B, then the communication controller 108 converts the email 204 received from the email interface 106A into the instant message 216. Upon converting the first communication into the second modality, the routine 300 proceeds to operation 306.

At operation 306, the communication controller 108 provides the converted first communication to the second interface. For example, upon converting the email 204 into the instant message 216, the communication controller 108 may provide the instant message 216 to the chat interface 106B. Upon receiving the converted first communication from the communication controller 108, the second interface may display the first communication in the second modality as specified by the second user 102B. The routine 300 then proceeds to operation 308.

At operation 308, the communication controller 108 receives a second communication in the second modality from a second interface. For example, if the second interface is the chat interface 106B, then the modality of the second communication is chat. The second communication may be a reply, such as the instant message 222, to the first communication. The routine 300 then proceeds to operation 310, where the communication controller 108 converts the second communication from the second modality into a first modality associated with a first interface. For example, if the first interface is the email interface 106A, then the communication controller 108 converts the instant message 222 received from the chat interface 106B into an email. Upon converting the second communication into the first modality, the routine 300 proceeds to operation 312.

At operation 312, the communication controller 108 provides the converted second communication to the first interface. For example, upon converting the instant message 222 into the email, the communication controller 108 may provide the email to the email interface 106A. Upon receiving the converted second communication from the communication controller 108, the first interface may display the second communication in the first modality as specified by the first user 102A.

Figure 4:
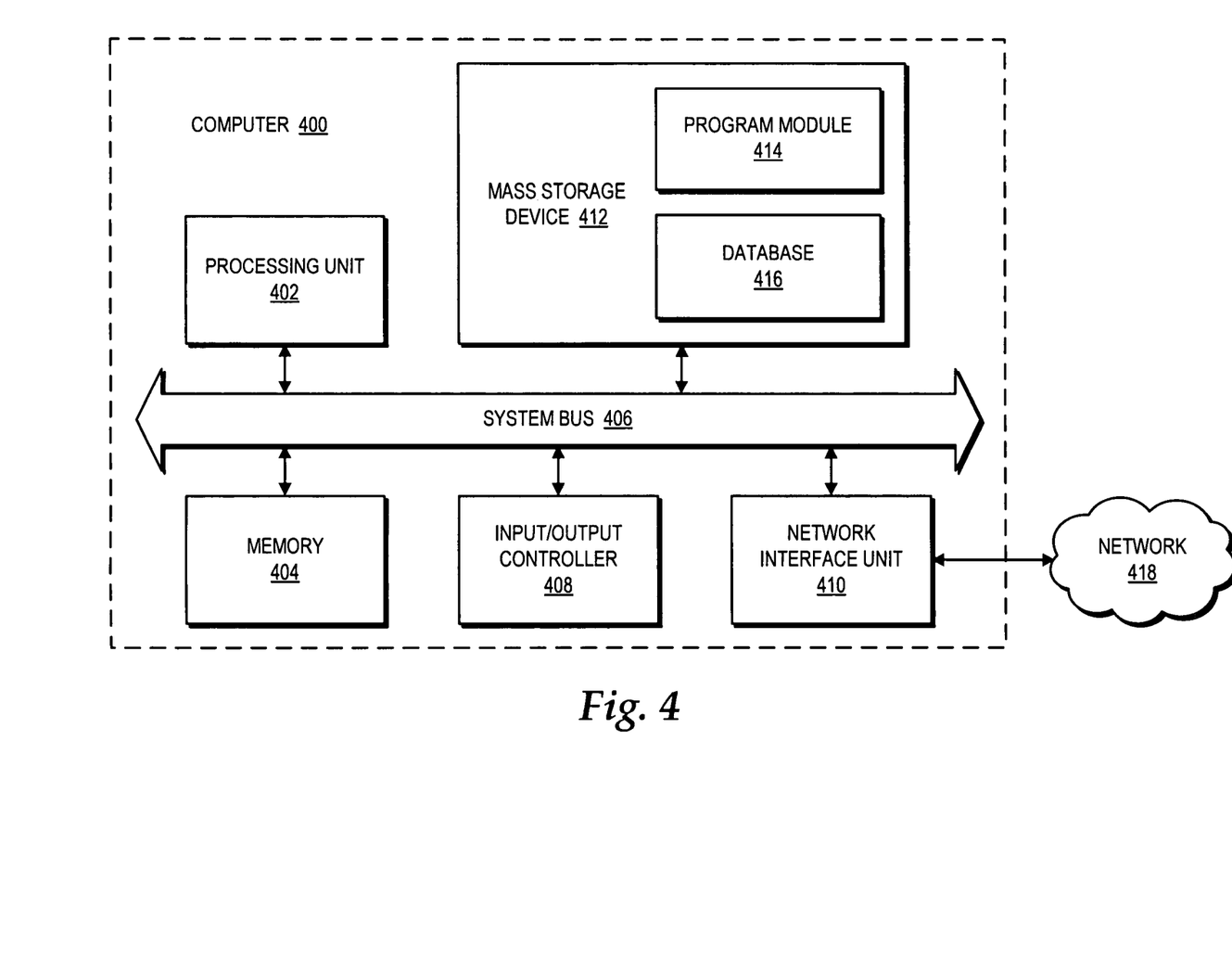
FIG. 4 is a computer architecture diagram showing aspects of an illustrative computer hardware architecture for a computing system capable of implementing aspects of the embodiments presented herein.

Referring now to FIG. 4, an exemplary computer architecture diagram showing aspects of a computer 400 is illustrated. Examples of the computer 400 include the first computer 104A and the second computer 104B. The computer 400 includes a processing unit 402 ("CPU"), a system memory 404, and a system bus 406 that couples the memory 404 to the CPU 402. The computer 400 further includes a mass storage device 412 for storing one or more program modules 414 and one or more databases 416. Examples of the program modules 414 include the email interface 106A, the chat interface 106B, and the communication controller 108. The mass storage device 412 is connected to the CPU 402 through a mass storage controller (not shown) connected to the bus 406. The mass storage device 412 and its associated computer-readable media provide non-volatile storage for the computer 400. Although the description of computer-readable media contained herein refers to a mass storage device, such as a hard disk or CD-ROM drive, it should be appreciated by those skilled in the art that computer-readable media can be any available computer storage media that can be accessed by the computer 400.

By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 400.

According to various embodiments, the computer 400 may operate in a networked environment using logical connections to remote computers through a network 418. The computer 400 may connect to the network 418 through a network interface unit 410 connected to the bus 406. It should be appreciated that the network interface unit 410 may also be utilized to connect to other types of networks and remote computer systems. The computer 400 may also include an input/output controller 408 for receiving and processing input from a number of input devices (not shown), including a keyboard, a mouse, a microphone, and a game controller. Similarly, the input/output controller 408 may provide output to a display or other type of output device (not shown).

Based on the foregoing, it should be appreciated that technologies for providing multi-modal communication through modal-specific interfaces are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for multi-modal communication via a communication controller operating in a computer network architecture, said controller associated with a user and responsive to the user's preference for a modality-specific user interface for communications, comprising:
    receiving from a first user from a first modality-specific user interface adapted to transmit and receive communications only in the first modality across a computer network, a first communication in a first modality, the first communication directed at a second user, wherein the first modality comprises email;
    upon receiving the first communication in the first modality from the first modality-specific user interface across the computer network, converting the first communication into a second modality adapted to transmit and receive communications only in the second modality based on a preference set by the second user, wherein the second modality comprises chat or short message service (SMS); and
    upon converting the first communication into the second modality, providing the first communication to a second modality-specific user interface across the computer network, the first modality-specific user interface capable of presenting communications in the first modality but not capable of presenting communications in the second modality and the second modality-specific user interface capable of presenting communications in the second modality but not capable of presenting communications in the first modality,
    wherein an incoming communication into the second modality-specific user interface is converted into the second modality of chat when the second user is online and into the other second modality of SMS when the second user is offline,
    wherein the incoming communication is converted to provide for the ability of the second-modality user interface to present the communication to the second user so that the first communication from the first modality-specific user interface appears to originate in the second modality and the first modality-specific user interface presents a second communication originating from the second user from the second modality-specific user interface in response to the first communication,
    wherein the second communication is converted to provide for the ability of the first modality-specific interface to present the second communication so that the second communication appears to the first user to originate in the first modality.

2. The method of claim 1, further comprising:
    receiving, from the second modality-specific user interface across the computer network, the second communication in the second modality;
    converting the second communication into the first modality; and
    upon converting the second communication into the first modality, providing to the first modality-specific user interface across the computer network, the second communication.

3. A method for multi-modal communication via a communication controller operating in a computer network architecture, said controller associated with a user and responsive to the user's preference for a modality-specific user interface for communications, comprising:
    receiving from a first user from a first modality-specific user interface adapted to transmit and receive communications only in the first modality across a computer network, a first communication in a first modality from the first user, the first communication directed at a second user, wherein the first modality comprises chat or short message service (SMS);
    upon receiving the first communication in the first modality from the first modality-specific user interface across the computer network, determining that the second user is associated with a second modality adapted to transmit and receive communications only in the second modality, wherein the second modality comprises email or SMS;
    upon determining that the second user is associated with the second modality, converting the first communication into the second modality based on a second preference set by the second user when the second user is online and converting the first communication into the other second modality of SMS when the second user is offline;
    upon converting the first communication into the second modality, providing the first communication to a second modality-specific user interface across the computer network;
    receiving, from the second modality-specific user interface across the computer network, a second communication in the second modality from the second user, the second communication directed at the first user;
    upon receiving the second communication in the second modality from the second modality-specific user interface across the computer network, determining that the first user is associated with the first modality;
    upon determining that the first user is associated with the first modality, converting the second communication into the first modality based on a first preference set by the first user; and
    upon converting the second communication into the first modality, providing the second communication to the first modality-specific user interface across the computer network, the first modality-specific user interface capable of presenting communications in the first modality but not capable of presenting communications in the second modality, the second modality-specific user interface capable of presenting communications in the second modality but not capable of presenting communications in the first modality, wherein the incoming communication is converted to provide for the ability of the second-modality user interface to present the communication to the second user so that the first communication from the first modality-specific user interface appears to originate in the second modality and the first modality-specific user interface presents a response communication originating from the second user from the second modality-specific user interface in response to the first communication, wherein the response communication is converted to provide for the ability of the first modality-specific interface to present the response communication so that the response communication appears to the first user to originate in the first modality.

4. The method of claim 3, wherein the second modality-specific interface displays notification of receiving the first communication in an inbox.

5. A computer-readable storage device having computer-executable instructions stored thereon which, when executed by a computer, cause the computer to:

receive from a first user from a first modality-specific user interface operating on a first computer across a computer network, a first communication in a first modality from a first user, the first communication directed at a second user, the first modality-specific user interface capable of presenting communications in the first modality but not capable of presenting communications in a second modality, wherein the first modality-specific user interface is adapted to transmit and receive communications only in the first modality, and wherein the second modality-specific user interface is adapted to transmit and receive communications only in the second modality, wherein the first modality comprises email and the second modality comprises chat or short message service (SMS);

upon receiving the first communication in the first modality from the first modality-specific user interface across the computer network, determine that the second user is associated with the second modality-specific user interface;

upon determining that the second user is associated with the second modality-specific user interface, convert the first communication into the second modality based on a second preference set by the second user when the second user is online and convert the first communication into the other second modality of SMS when the second user is offline;

upon converting the first communication into the second modality, provide the first communication to the second modality-specific user interface operating on a second computer across the computer network;

receive, from the second modality-specific user interface operating on the second computer across the computer network, a second communication in the second modality from the second user, the second communication directed at the first user, the second modality-specific user interface not capable of presenting communications in the first modality;

upon receiving the second communication in the second modality from the second modality-specific user interface across the computer network, determine that the first user is associated with the first modality, upon determining that the first user is associated with the first modality, convert the second communication into the first modality based on a first preference set by the first user; and upon converting the second communication into the first modality, provide the second communication to the first modality-specific user interface operating on the first computer across the computer network, wherein the second communication is converted to provide for the ability of the second-modality user interface to present the second communication so that the second communication from the first modality-specific user interface appears to the second user to originate in the second modality and the first-modality user interface presents a response communication, wherein the response communication is converted to provide for the ability of the first-modality specific interface to present the response communication so that the response communication appears to the first user to originate in the first modality.

* * * * *